United States Patent
Kalverkamp

(10) Patent No.: US 9,433,145 B2
(45) Date of Patent: Sep. 6, 2016

(54) HARVESTER FOR POTATOES, BEETS AND OTHER ROOT CROPS

(71) Applicant: Grimme Landmaschinenfabrik GmbH & Co. KG, Damme (DE)

(72) Inventor: Klemens Kalverkamp, Damme (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 356 days.

(21) Appl. No.: 13/707,619

(22) Filed: Dec. 7, 2012

(65) Prior Publication Data

US 2013/0149092 A1    Jun. 13, 2013

(30) Foreign Application Priority Data

Dec. 7, 2011  (DE) .................. 10 2011 120 377

(51) Int. Cl.
*A01D 33/10* (2006.01)
*A01D 90/10* (2006.01)
*A01D 33/00* (2006.01)

(52) U.S. Cl.
CPC .............. *A01D 33/00* (2013.01); *A01D 33/10* (2013.01); *A01D 90/10* (2013.01)

(58) Field of Classification Search
CPC .. A01D 33/10; A01D 41/1217; A01D 90/10; B60P 1/36; B60P 1/38
USPC ......................... 414/489, 505, 528
See application file for complete search history.

(56) References Cited

U.S. PATENT DOCUMENTS

| 1,415,034 A | * | 5/1922 | Hoelscher | 414/505 |
| 2,885,209 A | * | 5/1959 | Bruecker | 239/657 |
| 3,491,367 A | * | 1/1970 | Heyens | 171/115 |
| 3,912,094 A | * | 10/1975 | Balzer | 414/528 |
| 4,072,242 A | * | 2/1978 | Cook | 414/505 |
| 4,494,904 A | * | 1/1985 | Hill et al. | 414/491 |
| 5,338,140 A | * | 8/1994 | Ekdahl et al. | 414/346 |
| 5,528,890 A | * | 6/1996 | Gray et al. | 56/16.6 |
| 5,784,871 A | * | 7/1998 | Glancey et al. | 56/327.1 |
| 7,988,403 B2 | * | 8/2011 | Ricketts | 414/505 |

FOREIGN PATENT DOCUMENTS

| DE | 3812154 A1 | 10/1989 |
| DE | 39 00 573 A1 | 7/1990 |

(Continued)

OTHER PUBLICATIONS

Grimme Landmaschinenfabrik; brochure "Produktprogramm" L01. 1002.DE 12/10/2500; 2010 (cited in specification, p. 1, 2nd paragraph); pp. 14-17 and equivalent pages of English language brochure.

*Primary Examiner* — James Keenan
(74) *Attorney, Agent, or Firm* — Gudrun E. Huckett

(57) ABSTRACT

A harvester for potatoes, beets or similar root crops is in the form of a self-propelled or pulled bunker harvester. It has an intermediate or transfer bunker receiving harvested root crop after a cleaning phase. From the receiving space of the bunker, the root crop can be discharged by means of a conveying device that forms at least partially in the bunker a floor conveyer, has a lateral transfer module and can be oriented substantially transversely to the travel direction of the harvester. The conveying device interacts with a wall-type movable support structure at least in the area of a longitudinal side of the receiving space that is facing away from the lateral transfer module.

14 Claims, 2 Drawing Sheets

(56) References Cited

FOREIGN PATENT DOCUMENTS

| EP | 1 405 554 A1 | 4/2004 |
| EP | 1 591 001 A1 | 11/2005 |
| EP | 2 090 149 A1 | 8/2009 |
| GB | 630812 A * | 10/1949 | ............. A01D 33/10 |
| SU | 265018 | 11/1966 |
| SU | 1708178 A1 | 1/1992 |

* cited by examiner

HARVESTER FOR POTATOES, BEETS AND OTHER ROOT CROPS

BACKGROUND OF THE INVENTION

The invention concerns a harvester for potatoes, beets and other root crops wherein the harvester, in particular in the form of a bunker harvester, is comprises an intermediate or transfer bunker receiving harvested root crop after a cleaning phase, wherein from its receiving space the harvested root crop can be discharged by means of a conveying device that forms at least partially in the bunker a floor conveyer, comprises a lateral transfer module and can be oriented substantially transversely to the travel direction of the harvester.

For harvesting root crops in the form of potatoes, beets and other root crops, potato harvesters that are pulled by tractors or self-propelled harvesters have been known for a long time. In this connection, so-called transfer harvesters are used in which the harvested root crops that has been separated from adhering parts are transferred by a conveying device that is substantially oriented transversely to the travel direction of the harvester onto a collecting vehicle driving alongside the harvester. In addition to these transfer harvesters that are associated directly with the harvesting process, harvesters are also known that are referred to as bunker harvesters in which the harvested crops are collected in variably embodied receiving spaces of at least one bunker so that only after completion of a harvesting phase with filling of this bunker a later transfer process is required. Such harvesters with intermediate bunker are known in various embodiments on the market (company brochure "Produktprogramm", No. L01.1002.DE/12/10/2500 of the company Grimme Landmaschinenfabrik GmbH & Co. KG, 49401 Damme, Germany).

In a bunker construction in accordance with DE 39 00 573 A1, the root crops is moved in the area of a sidewall that is acting as a glide plate to a conveyer at the bottom. From here, the generally known discharge of the root crop is realized by means of a discharge conveyor that forms the second sidewall and is a second unit of the complex discharge system.

The invention concerns the problem to configure a harvester for various root crops such that the bunker provided for collecting the harvested crop enables with reduced technical expenditure an optimal distribution of the harvested crop in the receiving space and such that the subsequent emptying of the receiving space can be performed substantially without damage to and without loss of harvested crop.

SUMMARY OF THE INVENTION

The invention solves this object with a harvester for root crops in that the conveying device interacts with a wall-type movable support structure at least in the area of a longitudinal side of the receiving space that is facing away from the lateral transfer module.

The receiving space of the bunker is delimited at least at times during filling and/or discharging by the support structure that is essentially vertically extending.

The support structure has dimensions that make obsolete the additional arrangement of a substantially vertical longitudinal sidewall.

The support structure is provided with movement parts that at least when the conveying device is active assist its respective conveying direction.

The support structure in the receiving space forms a guiding contour for the root crop in such a way that in a return phase following a discharge phase in the area of the conveying device the residual quantities of root crop positioned thereon can be moved into a collecting zone of the receiving space.

The collecting zone forms a support contour in front of the vertical support structure.

The support structure is formed immediately as a movable section of the conveying device.

The moveable support structure in the area of the conveying device is connected with the floor conveyer and the transfer module.

The conveying device is provided with a belt conveyor that is driven in circulation and passes through the movable section of the support structure.

The belt conveyor by means of deflecting elements, respectively, forms the section of the vertical support structure.

The belt conveyor in the area of the support structure has two conveying shafts as deflecting elements that are supported one above the other on vertical bars.

The conveying shafts are drivable in the area of the support structure.

The conveying shafts are adjustable with respect to their spacing to each other.

The support structure is formed as a module that is active independent of the conveying device.

The wall-type support structure is pivotable or foldable into variable positions of use.

The wall-type support structure has movable sections.

The support structure is movable into a position of use which is in a common plane with the floor conveyer or into a position tilted relative thereto.

In the area of one or both transverse sides of the receiving space at least one movable support structure is provided, respectively.

A harvester for root crop in the form of a self-propelled or pulled bunker harvester is provided with a device that is referred to as intermediate or transfer bunker from which the harvested root crop is discharged after a collecting phase by means of a conveying device. The concept according to the invention of this bunker construction provides that the bunker construction at least in the area of a longitudinal side of the receiving space that is facing away from the lateral transfer module is provided with a wall-type support structure that can be aligned and moved. The latter can interact in a collecting phase, in an intermediate phase and/or a discharge phase with a conveying device and improve the utilization conditions of the bunker in this way.

This support structure can be provided in addition to a longitudinal sidewall of the bunker that is usually provided for delimiting the receiving space. Advantageously, the construction is however such that the wall-type support structure that is acting because of its movability as a multifunctional device is integrated into the bunker construction or into its receiving space with dimensions that make a longitudinal sidewall obsolete.

With this support structure that is substantially vertically aligned relative to the bottom of the receiving space it is achieved that the receiving space of the bunker at least at times during filling, storing and/or discharging is delimited by an active component module that can have a "controlling" effect on the collected harvested crop. In the filling phase of the receiving space, the support structure that is configured as a movable section can be displaced in addition to providing its substantially static support function such that the harvested crop, that can be optimally supported on the wall-type structure and can be stacked up to the desired filling level, is also exposed to a targeted movement within the receiving space in order to improve, for example, the filling condition.

During a subsequent discharge phase by means of the conveying device, the support structure configured as a movable section can enhance a targeted displacement of the harvested crop so that it is gently transferred onto the floor conveyor of the bunker and by means of the lateral transfer module of the conveying device is transferred to the transport vehicle that is adjacent to the harvester.

In accordance with the size ratios of the bunker and the receiving container of the transport vehicle, it may be required that upon complete filling thereof already before complete discharge of the receiving space the transfer process is to be interrupted and then in the area of the conveying device, or of the floor conveyor and the transfer module, a "residual quantity" of root crop or similar harvested crop is remaining. In particular for avoiding crop loss as harvesting is continued, this harvested crop that is suitable for a later transport must be returned into the receiving space in order to avoid an undesirable discharge of harvested crop onto the field. For this purpose, the discharge stroke of the conveying device that has been effective last can be adjusted to the opposite conveying direction so that the residual quantity that is still in the conveying area can be returned into the receiving space. During this return phase, the "movable" support structure can be used particularly efficiently in such a way that in the area in front of this wall-type vertical area of the support structure the residual quantity of the harvested crop can be held in a depression-like collecting zone without damaging the crop and thereby can be stored until the next emptying process takes place.

The support structure forms thus a functional unit which is provided with movable parts that, at least in case of an active conveying device, assist in its conveying direction so that the afore described conveying actions can be achieved in an optimal way. The movable support structure in this context can extend within the receiving space with substantially any guiding contour so that in the discharge phase as well as in the retaining phase the harvested crop can be influenced in an optimal way by the movable sections of the support structure. In this connection, it is provided that the support structure can extend into the region of the conveying device and therefore the movable sections with the area of the floor conveyor and the transfer module interact as a compact controllable conveying unit.

For a simple realization of this controllable concept, in an expedient embodiment it is provided that the conveying device is provided with a generally known belt conveyor. It can be driven in circulation in an embodiment "extended" about the support structure in such a way that the conveying run of this belt conveyor defines the movable section of the support structure. This "extended" belt conveyor can form with minimal expenditure variable predeterminable sections of the particularly vertical area of the support structure wherein deflection elements determine the course. In this connection, with at least one central and/or additional belt drive also these sections of the support structure are engaged and the movement directions that are provided respectively can be set optimally by means of a control.

In an expedient embodiment, it is provided that the belt conveyor in the area of the support structure has two conveying shafts as deflection elements that are supported on top of each other at vertical bars, wherein these conveying shafts can be configured also as drivable elements. The conveying shafts are adjustable with respect to their vertical spacing so that the entire support structure is provided with optimal conditions for the circulating sections of the conveying device and the belt conveyor.

In addition to this embodiment of the system, integrated in the conveying device with the floor conveyor and transfer module, it is conceivable that the support structure is embodied however as a module that is acting substantially independent of the conveying device. This support structure that can be defined in the form of an independent vertical conveyor belt, roller belt or similar conveying device is advantageously arranged in the area of the longitudinal sidewall that defines the bunker. This independently movable support structure can be switched on as needed synchronously with the floor conveyor or the transfer module in any operating phase of the conveying device.

Also, it is provided that the wall-type support structure, in the form of the belt conveyor or the independent module, forms a system that is connected to the bunker construction so as to be pivotable or foldable relative to the receiving space into variable positions of use. In this connection, the wall-type support structure can also be formed with displaceable, foldable, and/or pivotable sections so that wall areas, for example, like an overhang, can delimit the upper area of the receiving space.

In an expedient embodiment it is provided that the support structure is moveable into positions of use that are extending in the same plane as the floor conveyor or are tilted from this position. In this connection, for example a folding movement of the support structure can be provided that is directed from the receiving space outwardly. In this way, a discharge process is also conceivable at the longitudinal side of the harvester that is opposite the transfer module and useable, for example, in case of "emergency emptying" or the support structure is useable for transfer of residual quantities of the harvested crop in outwardly folded position.

In expanding on the afore described concept, it is conceivable to mount the support structure in the bunker at variable locations and to provide this system also in the area of one or both transverse sides of the receiving space. In this way, in these areas by movable wall-type parts or sections a support action of the respective conveying process is possible also and the respective collecting or transfer phase of such transfer bunkers can be further optimized.

BRIEF DESCRIPTION OF THE DRAWINGS

Further details and advantageous embodiments of the invention result from the following description that shows an embodiments of the harvester according to the invention with improved bunker.

DESCRIPTION OF PREFERRED EMBODIMENTS

Figure 1:
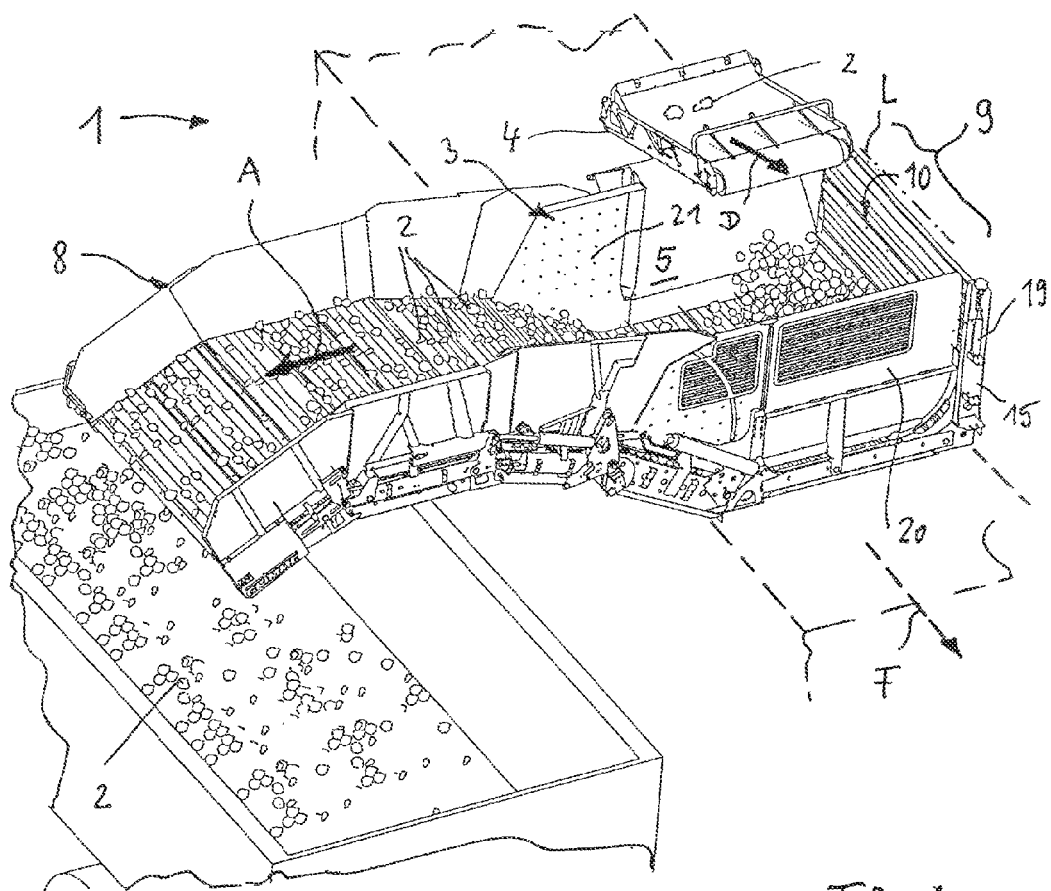
FIG. 1 is a perspective detail illustration of a harvester in the area of a transfer bunker in a transfer phase.
Figure 2:
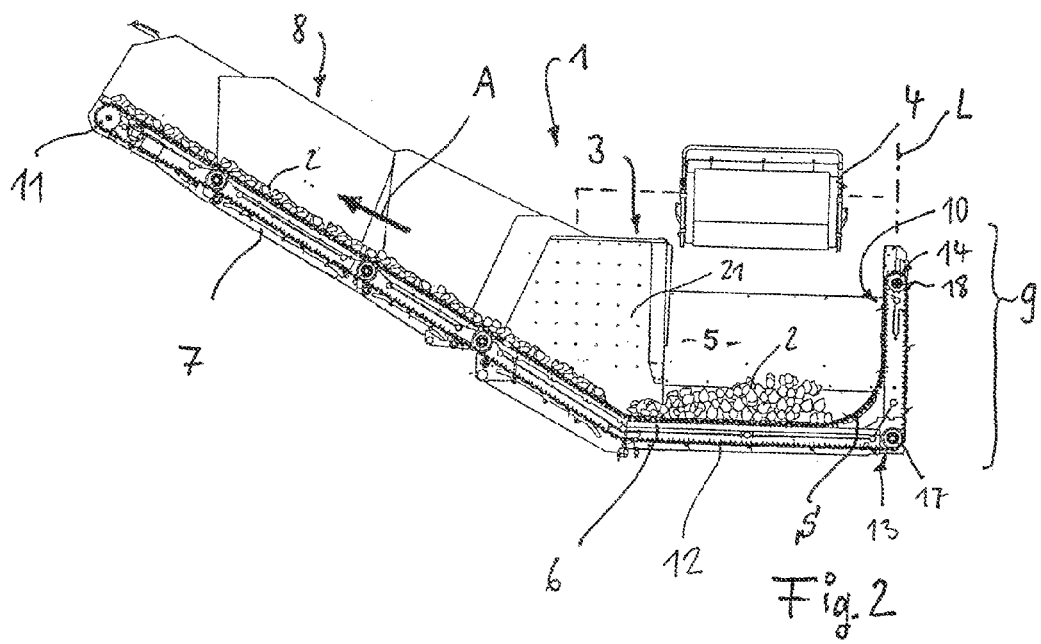
FIG. 2 is a cross-section illustration according to line II-II in FIG. 1.

In FIG. 1, in a schematic perspective illustration a harvester for potatoes, beets or similar crops 2 is illustrated and referenced by 1. This harvester 1 can be particularly in the form of a self-propelled or pulled bunker harvester that has an intermediate or transfer bunker 3 for receiving a root crop 2 after a cleaning phase (not illustrated). The root crop 2 is conveyed by means of a conveying device 4 into a receiving space 5 and is stored therein at least at times during a harvesting cycle of the harvester 1. From this receiving space 5, the root crop 2 is discharged by means of a conveying device 8 that forms at least partially in the bunker a floor conveyor 6, is provided with a lateral transfer module 7 and extends substantially transverse to the travel direction F of the harvester 1 (arrow A, FIG. 1).

Figure 3:
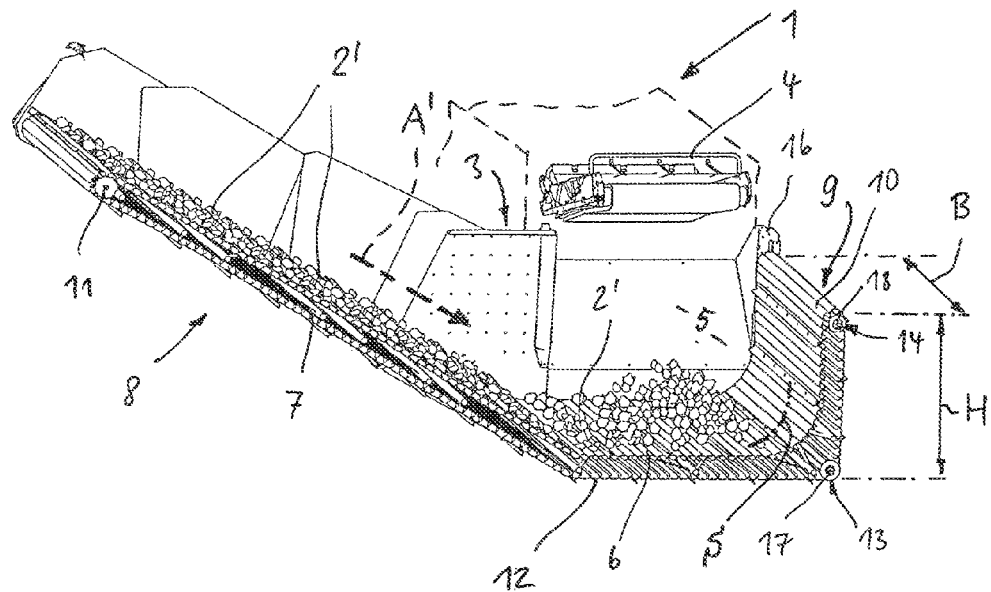
FIG. 3 is a sectioned perspective illustration similar to FIG. 2 in a return conveying phase in the area of the bunker.

The concept according to the invention of the harvester 1 provides that the harvester in the area of its bunker 3 interacting with the conveying device 8 is provided with a wall-type movable support structure 9 at least in the area of a longitudinal side L of the receiving space 5 that is facing away from the lateral transfer module 7. In this way, it is achieved that the receiving space 5 of the bunker 3 at least at times during filling (arrow D, FIG. 1) and/or discharge (arrow A) can be delimited by the substantially vertically extending support structure 9. This support structure 9 can be provided in addition to a sidewall (not illustrated) that can be positioned in the area of the longitudinal side L; advantageously, it is however provided that the support structure 9 has dimensions H, B (FIG. 3) that make obsolete the additional arrangement of a sidewall.

The system with the movable support structure 9 is designed such that this construction has integrated therein movement parts, generally identified by 10, and with these parts 10, at least upon activated conveying device 8, the respective crop stream movements are assisted by the movement parts 10 in the respective conveying directions A or A'.

When looking at FIG. 1 through FIG. 4, it is apparent that the support structure 9 in the rim area of the receiving space 5 is effective in the manner of a guide contour for the root crop 2', In particular, in a return phase (arrow A', FIG. 4) following a discharge phase (arrow A, FIG. 1) reverse conveying conditions are required in order to move residual quantities of root crop 2' (FIG. 3) that are still positioned in the area of the conveying device 8 to a collecting zone Z of the receiving space 5. From the illustration according to FIG. 4 it is apparent that the collecting zone Z is formed immediately in front of the vertical support structure 9 and the residual quantity of the root crop 2' is optimally stored here.

Upon return movement of the root crop 2' (FIG. 3 and FIG. 4), the crop is optimally guided along a curved contour S by the support structure 9 wherein a rolling movement that is indicated by the arrow R in the area S occurs such that damage of the harvested crop 2' as well as jamming of the harvested crop are prevented due to a substantially angle-free and edge-free configuration of this collecting zone Z.

An advantageous constructive configuration of the support structure 9 is achieved according to the invention in that the support structure 9 is configured immediately as a movable section of the conveying device 8 and the latter is then substantially extending monolithically below the root crop 2, 2'. In this connection, it is provided that the movable support structure 9 is connected immediately with the floor conveyor 6 and the transfer module 7 so that in this way a compact transport unit is provided.

The representations according to FIGS. 1 through 4 illustrate clearly this embodiment of the system wherein the conveying device 8 is provided with a belt conveyor 12 that is driven in circulation and moves through the moveable section of the support structure 9. In the simplest embodiment the belt conveyor 12 is designed such that by means of deflecting elements 13, 14 that are arranged above each other the movable section of the vertical support structure 9 is defined. These deflection elements 13, 14 are expediently formed by two conveying shafts 17, 18 that are supported one above the other at two vertical bars 15, 16.

It is conceivable in this connection that additionally to the drive 11 in the area of the conveying device 8 also one or two of the conveying shafts 17, 18 are provided as driven components. The construction provides that the conveying shafts 17, 18 are adjustable by means of an adjusting element 19 that is provided in the area of the vertical bars 15, 16. In this way, the conveying shafts 17, 18 can be adjusted relative to each other with regard to their vertical spacing (height H).

A further embodiment of the support structure 9 provided for the harvested machine 1 is that it is configured as a module (not illustrated) that is acting independently of the conveying device 8. Conceivable is in this connection that the support structure 9 is provided with a separate drive and that, in contrast to the illustrated embodiment, also independent adjustments in the area of the independent support structure 9 can be realized.

Figure 4:
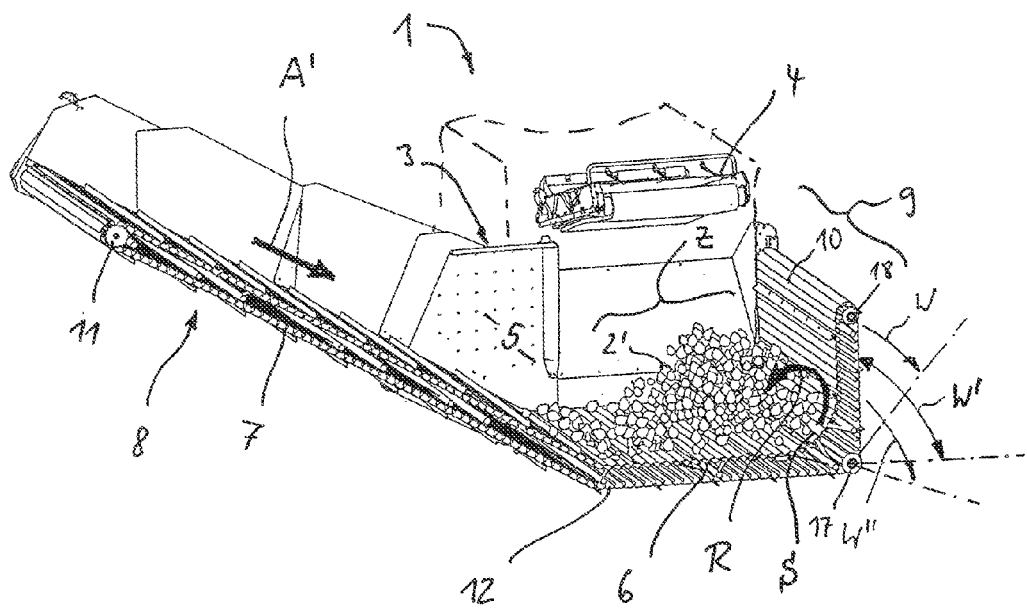
FIG. 4 is a sectioned perspective illustration similar to FIG. 3 with harvested crop in the area of the receiving space.

In supplementing the illustrated embodiment according to FIGS. 1 to 4 or the independent support structure, it is also provided that the respective wall-type movable system can be embodied so as to be pivotable or foldable into variable positions of use. FIG. 4 indicates with respective angle positions W, W', W'' the conceivable pivot positions of the support structure 9. In this context, the support structure 9 can be pivoted into a position of use W' in which it is in a common plane with the floor conveyor 6 so that already in this position a discharge of a residual quantity of root crop 2' is possible (as the conveyor 12 is running in the direction A'). This conceivable discharge, in a direction toward the side of the harvester that is facing away from the transfer module 7, is also conceivable in the respective positions W and W'' of the support structure 9.

Also, the afore described folding construction can be designed such that the wall-type support structure 9 has foldable sections only along its contour so that for example the upper rim area of the support structure 9 can be pivoted toward the receiving space 5 and that therefore in this area a protective position acting like an overhang is defined that prevents escape of root crop 2'.

In a constructive further development of the afore described embodiment, a harvester 1 with a bunker 3 is also conceivable in which the movable support structure 9 is arranged in the area of one or both transverse sides 20, 21 of the receiving space 5 (not illustrated) and the loading and discharging system of the bunker 3 can be adjusted in this way to further application situations, for example, change of root crops with changing conveying properties.

The specification incorporates by reference the entire disclosure of German priority document 10 2011 120 377.3 having a filing date of Dec. 7, 2011.

While specific embodiments of the invention have been shown and described in detail to illustrate the inventive principles, it will be understood that the invention may be embodied otherwise without departing from such principles.

What is claimed is:

1. A harvester for potatoes, beets and other root crops, the harvester comprising:
 a transfer bunker provided with a receiving space in which harvested root crop is received in a filling phase, wherein the receiving space is delimited by a bottom, two opposed end walls, and at least one longitudinal wall connected to the two end walls;

a conveying device oriented substantially transversely to a travel direction of the harvester and operative in a first conveying direction in a discharge phase and in a second opposite conveying direction in a return phase;

wherein the conveying device comprises a floor conveyer arranged in the transfer bunker and forming the bottom of the receiving space;

wherein the conveying device further comprises a lateral transfer module connected to a first end of the floor conveyor and comprising a discharge end remote from the floor conveyor;

wherein the conveying device further comprises a wall-type moveable support structure that is connected to a second end of the floor conveyer and forms the at least one longitudinal wall of the receiving space opposite the lateral transfer module;

wherein the wall-type movable support structure, the floor conveyor, and the lateral transfer module together form a compact transport unit comprising a continuous belt conveyor extending across the wall-type movable support structure, the floor conveyor, and the lateral transfer module to the discharge end and from the discharge end back to the wall-type movable support structure;

wherein, in the discharge phase, the continuous belt conveyor directly moves the harvested root crop out of the receiving space across the lateral transfer module to the discharge end and directly discharges the harvested root crop via the lateral transfer module and the discharge end into a transport vehicle in the first conveying direction;

wherein the wall-type movable support structure is provided with moveable parts that, at least when the conveying device is active, assist in moving the harvested root crop in the first conveying direction out of the receiving space or in the second opposite conveying direction back into the receiving space;

wherein the wall-type movable support structure forms a curved guiding contour for the harvested root crop in the receiving space and wherein the receiving space comprises a collecting zone immediately adjacent to the curved guiding contour of the wall-type moveable support structure such that, in the return phase following the discharge phase, residual quantities of the harvested root crop positioned on the continuous belt conveyor are moved in the second opposite conveying direction against the curved guiding contour and the curved guiding contour subjects the harvested root crop to a rolling movement in a direction away from the wall-type moveable support structure into the collecting zone of the receiving space.

2. The harvester according to claim 1, wherein the wall-type movable support structure extends essentially vertically and delimits the receiving space of the transfer bunker at least at times during the filling phase and/or the discharge phase.

3. The harvester according to claim 1, wherein the wall-type movable support structure forms a substantially vertical longitudinal sidewall of the receiving space.

4. The harvester according to claim 1, wherein the collecting zone forms a support contour in front of the wall-type movable support structure, wherein the support contour has a substantially angle-free and edge-free configuration.

5. The harvester according to claim 1, wherein the wall-type movable support structure is a movable section of the conveying device.

6. The harvester according to claim 5, wherein the continuous belt conveyor is driven in circulation about the wall-type movable support structure, the floor conveyor, and the transfer module.

7. The harvester according to claim 6, wherein the belt conveyor has deflecting elements that are a part of the moveable section.

8. The harvester according to claim 7, wherein the deflecting elements are two conveying shafts that are supported one above the other on vertical bars in the area of the wall-type movable support structure.

9. The harvester according to claim 8, wherein the conveying shafts are drivable in the area of the wall-type movable support structure.

10. The harvester according to claim 9, wherein the conveying shafts have a spacing relative to each other and the spacing is adjustable.

11. The harvester according to claim 1, wherein the wall-type movable support structure is pivotable or foldable into variable positions of use.

12. The harvester according to claim 11, wherein the wall-type movable support structure has movable sections.

13. The harvester according to claim 11, wherein the wall-type movable support structure is movable into a first position of use which is in a common plane with the floor conveyer or into a second position of use tilted relative to the first position of use.

14. The harvester according to claim 1, in the form of a self-propelled bunker harvester or pulled bunker harvester.

* * * * *